United States Patent [19]
Pereira

[11] Patent Number: 5,809,230
[45] Date of Patent: Sep. 15, 1998

[54] SYSTEM AND METHOD FOR CONTROLLING ACCESS TO PERSONAL COMPUTER SYSTEM RESOURCES

[75] Inventor: J. L. A. Pereira, Buford, Ga.

[73] Assignee: McLellan Software International, LLC, Atlantic, Ga.

[21] Appl. No.: 587,143

[22] Filed: Jan. 16, 1996

[51] Int. Cl.$^6$ ................................ G06F 11/00
[52] U.S. Cl. ................................ 395/186
[58] Field of Search .................. 395/186, 187.01, 395/188.01, 183.12, 652; 380/3; 364/286.5

[56] References Cited

U.S. PATENT DOCUMENTS

| | | |
|---|---|---|
| 4,931,783 | 6/1990 | Atkinson . |
| 4,951,249 | 8/1990 | McClung et al. . |
| 5,012,514 | 4/1991 | Renton . |
| 5,113,442 | 5/1992 | Moir . |
| 5,212,729 | 5/1993 | Schafer . |
| 5,263,158 | 11/1993 | Janis . |
| 5,265,163 | 11/1993 | Golding et al. . |
| 5,375,243 | 12/1994 | Parzych et al. . |
| 5,384,910 | 1/1995 | Torres . |
| 5,483,649 | 1/1996 | Kvznetsov et al. ............ 395/186 |
| 5,537,540 | 7/1996 | Miller et al. ............ 395/183.14 |
| 5,564,016 | 10/1996 | Korenshtein ............ 395/186 |
| 5,586,301 | 12/1996 | Fisherman et al. ............ 395/186 |
| 5,627,967 | 5/1997 | Daverer et al. ............ 395/188 |
| 5,628,015 | 5/1997 | Singh ............ 395/186 |
| 5,657,470 | 8/1997 | Fisherman et al. ............ 395/480 |
| 5,701,477 | 12/1997 | Chejlava, Jr. ............ 395/652 |

OTHER PUBLICATIONS

Microsystem Software, "Microsystem Software Announces Cyber Patrol Internet Access Management Vtility", Lttp://www.Microsys.Com/prfiles/cp795.htm, pp. 1–3, Jul. 1995.
Microsoft Press, "Introducing Microsoft Windows 95", pp. 55–57, copyright 1995.
Franklin Tessler, "Launch Pad 1.0", www.macworld.com, Magazine Review, p. 1 Jan. 1995.
Microsystems Software, "Mycrosystems Software Announces Cyber Patrol I.O for Macintosh and Cyber Patrol 2.0 for Windows", http://www.microsys.com/prfiles/cp895.htm, pp. 1–3, Aug. 1995.
Microsystems Software, "Mycrosystems Software Announces Cyber Patrol Home Edition Basic Internet Filtering for Free", http://www.microsys.com/prfiles/cphe–fre-.htm, pp. 1–2, Oct. 1995.
tritech software, Inc. *Winbolt Ver. 1.0 User's Manual*, 1994–1995.
Kent–Marsh Ltd., *Winshield©User Guide*, 1995.
Apple Computer, Inc. *AtEase 3.0 Owner's Guide*, 1995.
*Folder Bolt For Windows User Guide*, Kent Marsh Ltd., 1994.
*Scua Plus*, (product brochure, 4 enclosures), Mach II Software, 1989.

Primary Examiner—Robert W. Beausoliel, Jr.
Assistant Examiner—Scott T. Baderman
Attorney, Agent, or Firm—Morris, Manning & Martin, L.L.P.

[57] ABSTRACT

A system and method for controlling access to computer resources of a computer is disclosed. The access control program preferably includes a plurality of program components, which may be terminate stay resident (TSR) programs, for intercepting interrupt service calls. The interrupt service calls are verified to determine whether the user is authorized for the resource requested in the service call. The program components use files containing a list of authorized resources for the computer user. These files are, preferably, used at system initialization to modify the system resource files used by the operating system to identify program and program groups which are displayed to a user. A boot protection program is also disclosed which may be installed with the access control program to prevent a boot program stored on media within the diskette drive from acquiring control of the system during system initialization. The boot protection program corrupts the master boot record, boot record and partition table so that other boot programs do not have sufficient information to initialize the system. The master boot program is modified to access this requisite information elsewhere during system initialization.

18 Claims, 10 Drawing Sheets

SYSTEM AND METHOD FOR CONTROLLING ACCESS TO PERSONAL COMPUTER SYSTEM RESOURCES

FIELD OF THE INVENTION

This invention relates to control of local resources on a personal computer and, more particularly, to control of user authorization and access to local resources on a personal computer.

BACKGROUND OF THE INVENTION

The personal computer, or PC, was first introduced in the early 1980s. These systems generally include a hardware platform of a processor, memory and input/output peripherals that support local resources such as a display monitor, keyboard, hard disk drive, a diskette drive and communication ports. This hardware platform is controlled by an operating system. The operating system is software which controls the interaction between a user and the local resources. Usually this control is performed by controlling the communication interface between utility programs for the local resources and application programs executing on the system.

The number and type of application programs available for a user shortly after the introduction of the PC were not too many or diverse. As a result, the operating system for a PC generally permitted any authorized user to access any resource or file available on the system. However, as PCs proliferated, the number of companies which made software for the systems and the types of software offered for the systems also increased. For example, adult users began to use various financial analysis, organizational, and word processing programs to keep financial records, organize housekeeping or family schedule information and create documents for home and family functions. Adolescents used word processing programs and resource programs such as multimedia encyclopedias to generate reports for school. For younger children, programs for educational interaction or edutainment became commonplace. Thus, all members of a family had a use for the PC and began to need access to the system.

While all family members may have a need for access to the PC, not all members need access to all the resources on a PC. For example, the adults in a family have concerns that the bank records and check balancing files may be inadvertently destroyed by a younger member of the family. Thus, there is a need to segregate files for one user on a PC from the other users. One way to keep a user from accessing certain files is to keep the user from gaining access to the application program that modifies the content of the file. Programs which control access to application programs are known which require a user to enter a password before the operating system activates the program for the user. If the user does not enter the correct password, the requested program is not activated. Without being able to use the program that manipulates the file contents, the user is discouraged from trying to access a particular file.

There are a number of limitations to this protection scheme. For one, all users see all of the application programs that are available on the system. Of course, if a user does not know the password for a program, the user quickly learns that the program is not accessible. For some users this may be satisfactory, however, some inquisitive and talented users may consider the denial of access to a program a challenge. The attempts of such users to circumvent the protection program may result in damage beyond the few files to which the user was being denied access. Another limitation is that the user may legitimately need access to an application file but not to all of the files which may be manipulated by the application program. For example, an adolescent user may require access to the word processing program to generate a paper for school but not the letter containing details of a personal matter being discussed with a counselor for another member of the family. Programs which use a password to limit access to a file are also known but these programs also notify a user of his or her unauthorized status for the file which may result in attempts to break the access lock. Accordingly, there is a need for denying access to programs or files on a PC without informing the user of the denied access or of the program's or file's existence.

Recently, interest in the Internet and the World Wide Web (WWW) has resulted in millions of PC users purchasing subscriptions to Internet services, browsers for viewing Web sites and high speed modems for downloading files to a PC. While the information services available over the Internet and WWW can be a useful educational supplement to the programs already available on a user's system, there are also sites and services which are not desirable for all members of a family. For example, sexually explicit sites are accessible over the Internet and WWW. Also, some discussion or talk groups may be used by unscrupulous people to contact adolescents or young children so they may later meet the adolescents or children without adult supervision. Thus, there is a need for controlling which users may access the programs and communication resources required for Internet and WWW access.

Granting a user access to certain programs or files should not mean that the user's access rights are unqualified. For example, a parent may wish to deny access to the game programs available on a PC during the afternoon hours for a school age family member but would like to encourage the use of the PC for preparation of the student's work. However, the parent may want to grant access to the games after completion of the student's homework as a reward for a job well done. Currently, a parent would not be able to achieve such time selective control over the programs, files and resources of a PC in an automatic manner.

Some users, who become aware of resources to which they are denied access, attempt to circumvent access control systems and methods by aborting operating system operation and rebooting the system. The user may then attempt a number of methods for obtaining access to the denied resource. One method is to let the reboot proceed until the operating system is loaded but terminate the reboot before the user interface program begins execution. Usually the user interface or some program associated with it performs the access control function. By terminating the reboot prior to the user interface activation, a user knowledgeable about operating system commands may use the operating system to explore the resources available on the system. The user may even by able to modify the access control program to grant the user rights to resources previously denied to the user. Another method of obtaining unauthorized access is to place a system disk containing a system initialization program written by the user in the diskette drive of the system. Most PCs examine the diskette drive for a system initialization program following execution of the Basic Input and Output System (BIOS) program. The BIOS program is a low level program that initializes and verifies basic input and output functions of the PC and then relinquishes control for the remainder of system initialization. If the user's system initialization file on the diskette drive is executed before the initialization file on the hard disk is started, then the user may prevent the user interface and access control program from being executed.

One known way of preventing a system boot from a diskette drive is to install an extended BIOS card and program. Such cards and programs are set forth in U.S. Pat. Nos. 4,951,249 and 5,113,442. These devices modify the interrupt vectors for the hard disk and keyboards so that the new routines executed in response to these interrupts do not permit a user to gain unencumbered access to the operating system or hard drive. While these devices may be effective, they both require an expansion card which must be inserted in the expansion card bus. Thus, these devices take a card slot which may be otherwise used to enhance the performance of the PC. Additionally, such devices may be defeated by powering down the system and simply removing the expansion card. What is needed is a way of preventing a system boot from a diskette drive without adding a hardware component to the system which may be removed to defeat the system.

At the time that PCs were introduced into the market place the Disk Operating System (DOS) was frequently used for the systems. Because many users found DOS commands cryptic or difficult to understand, user interfaces which communicated between a user and DOS were developed. The interface which is installed in many, if not most, of the PCs today is the Windows program interface from Microsoft of Redmond, Washington. The Windows program facilitates a user's interaction with a PC because it permits a user to activate programs by simply placing a cursor over an icon by using a mouse and activating the program by depressing a button on the mouse. Selections within a program are provided by the Windows program in like manner through a Graphical User Interface (GUI). Thus, many PC users view Windows as an operating system, even though it is an interface between GUI and DOS programs. However, some users see Windows as an unsecured access port to a PC. To gain access to the PC, such users abnormally terminate a program or terminate the execution of the Windows program itself, to gain access to DOS. Since these users are familiar with DOS, they may then investigate the PC and its resources without intervention from an access control component of the Windows program. What is needed is an access control program that is seamless across the Windows/DOS interface.

As can be ascertained from the discussion above, there is a need for a PC access control system and method that can limit each user to a predefined set of resources on the PC without informing the user of the resources not available to the user. There is a need for a PC access control system and method that permits time selective control over a PC's resources. There is also a need to prevent a system boot from a program stored on media in the diskette drive of the PC. There is also a need for a PC access control system and method which provides seamless access control over a Windows/DOS interface in a PC.

SUMMARY OF THE INVENTION

The above limitations of previously known PC access control systems are overcome by a system and method implemented in accordance with the principles of the present invention. The method of the present invention includes the steps of storing a user identifier and a list of computer resources for each user of a PC system, displaying only the computer resources in the list corresponding to the user identifier for the user active on the PC system so that the user active on the PC system only sees the resources which the user may access, and limiting said active user's access to the computer resources in the list of computer resources stored with the user identifier.

This inventive method does not indicate to a user on a PC system the other resources on the system which are not accessible by the user. Accordingly, there is a reduced likelihood that the user knows what other resources are on the PC system and this in turn reduces the likelihood that the user will attempt to gain access to the other resources on the system. On PCs implementing a Windows program type interface, the list of the computer resources are preferably kept in files which are used to modify Group and INI files through the Dynamic Data Exchange (DDE). The modified system files are used to display group and program icons which may be activated by a user to launch a program. Once the system files have been modified, the access control program prevents a user from restoring the deleted group displays and programs to the system files. Thus, the user cannot restore deleted group displays and programs even if the user knows the file names for deleted resources. To restore the system files for the next user, the method of the present invention encrypts and stores an unabridged version of the system files which contain all of the groups and programs which are available on the system to a user having no limitations. At the system start-up for each user, the method retrieves and decrypts the unabridged version and deletes those programs and groups not contained in the corresponding list for the user. In this way, the system may be configured to only display the authorized resources for each user without losing a reference to all programs and groups possible on the system.

The method of the present invention is preferably implemented with three program components. One program component maintains a memory map for the address space for which a user is authorized. A second program component monitors all DOS or Windows file management access calls and verifies whether the user is authorized to access a file, directory, drive, or port. A third program component monitors all BIOS functions and verifies whether the requested access is authorized. As a result, system calls which a knowledgeable user may attempt to execute through user written programs, abnormally terminated programs, DOS or Windows system calls, or BIOS functions are trapped by one of the program components. The program components respond with error messages for resources for which the user is not authorized. An additional benefit of this preferred implementation is that each program component verifies the existence of the other two program components whenever one program component is executed. This protects against a user modifying one program component in an effort to circumvent the system. Whenever an uncorrupted program component executes, it would detect the change in the other program components and immediately execute a system reset. The initialization following system reset restores the program components from the hard disk. Most preferably, the program components in the Windows 3.x environment are implemented with terminate stay resident (TSR) programs while virtual device drivers (VxD) programs are used in Windows 95 systems.

The system of the present invention also uses the DOS Protected Mode Interface (DPMI) to restrict access to a user regardless of whether DOS or the Windows interface program is operating. Normally, DOS and Windows programs execute in mutually exclusive address spaces. For that reason, an exit from the Windows operating environment would cause the DOS programs to execute without access to the restricted use lists that had been used in the Windows environment. However, the program component that implements the operating environment change provides the addresses of the program component memory space to the DPMI of the Intel or Intel equivalent processor. This permits the program components to continue to execute with access to the restricted lists even though the operating environment has changed.

The method of the present invention may be further supplemented by a boot program protection method which prevents a boot program stored on media within a diskette drive from initializing the system. The boot program protection method includes storing the master boot record and partition table of the PC system hard drive in a non-standard location on the hard drive. This means that a system initialization program implementing the method of the present invention knows where to access the master boot record and partition table to initialize the system. To further frustrate a user boot program which may attempt to intervene during system initialization, the method of the present invention removes hard disk size and format data from the boot record and encrypts the partition table at the standard location on the hard disk. At system initialization, the master boot record restores the boot record as it can ascertain the location of files on the hard disk needed for system startup such as CONFIG.SYS and others. This software only protection scheme is more simple to install and more difficult to defeat than the previously known methods which require the addition of an expansion card or the like.

The system of the present invention includes a computer program that resides on the hard disk of the PC system. The program includes a primary user module which is used by the person installing the program to define the programs, files, directories, times of access, and hardware resources which may be accessed by each user. These files each contain a user identifier and list of computer resources defined as being accessible by the user. These files are encrypted and stored at locations on the hard drive only known to the access control program. Since the access control program may also implement the boot program protection method as well, there may be further difficulty in another being able to ascertain the location of the list files on the hard disk. The program also includes a startup module which is activated during system startup once a user has been authorized for system startup. The startup module uses the identifier corresponding to the authorized user and retrieves the corresponding list of computer resources. This list is then used to modify the system files for the user. These modified files are then stored in memory to be accessed by the access control program. Thereafter, only the programs and groups for which the user is authorized are displayed. Further, any system call for a resource or directory is trapped by one of the Program components of the access control program which sends an error message in response to a request for an unauthorized resource.

Thus, the method and system of the present invention provides an access control program for a PC that may be tailored to limit access to programs, files and other resources of the PC differently for each user. Furthermore, the system maintains a list of the authorized resources for each user regardless of whether the Windows interface or DOS system is the active user interface. The invention may also include a boot protection feature which reduces the likelihood that a user may interrupt system initialization and gain unauthorized access to the PC operating system.

DETAILED DESCRIPTION

Figure 1:
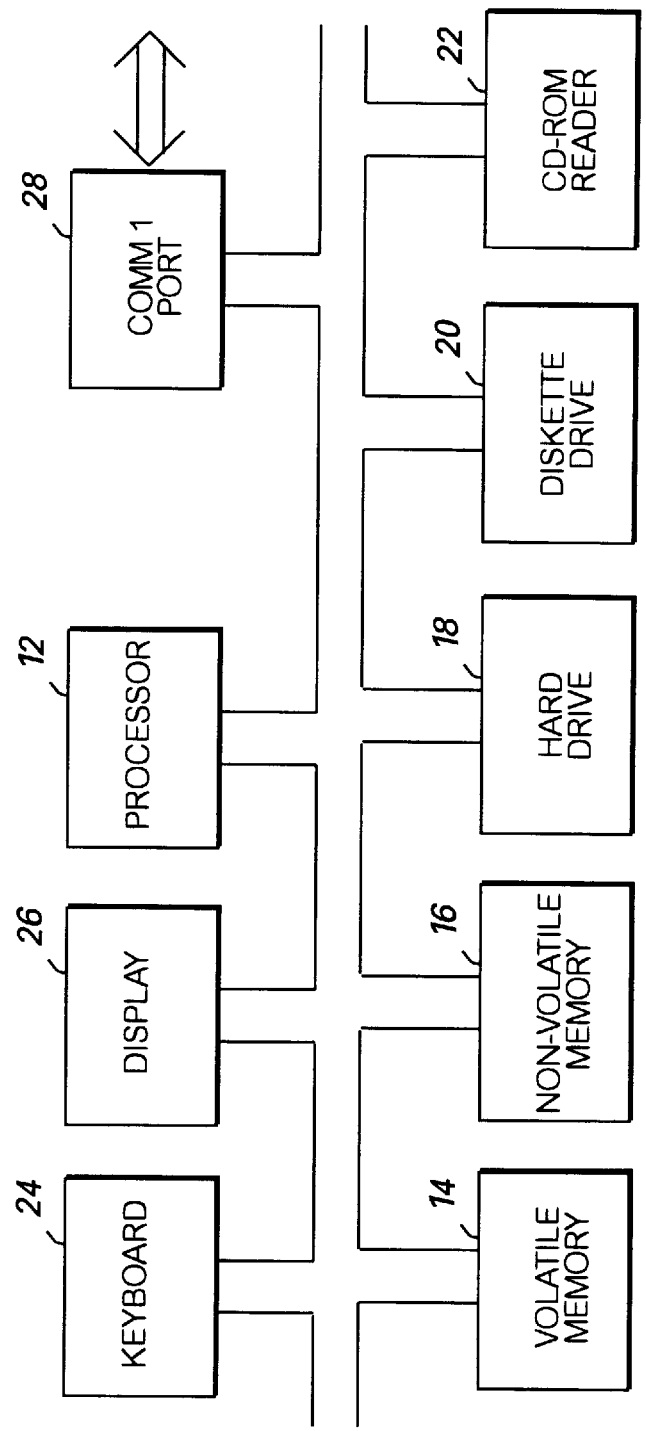
FIG. 1 is a block diagram of a system in which the present invention is implemented.

A personal computer or PC system in which the method and system of the present invention is implemented in shown in FIG. 1. The system 10 includes a processor 12, volatile memory 14, non-volatile memory 16, and I/O peripherals 18–28, all of which are coupled together by a system bus 34. Some of the I/O peripherals generate interrupts which cause the processor to transfer program control to a predefined location for interrupt processing and eventual transfer to a routine for servicing the peripheral which generated the interrupt. For example, an interrupt generated by a hard disk typically causes the processor to transfer program control to address 21H. There the environment of the program currently being executed is saved on the system stack behind the address of the next instruction to process in the interrupted program. Control is then transferred to a hard disk service routine which performs the input or output operation which resulted in the interrupt. Thereafter, the environment of the interrupted program is restored, interrupts reenabled and control transferred to the next instruction address previously stored on the stack.

The system 10, in which the system and method of the present invention is used, is preferably a personal computer (PC) in which the processor 12 is preferably an Intel 80286 or better or equivalent thereof which implements a DOS Protected Mode Interface (DPMI). Additionally, the method of the present system is preferably implemented in the assembler language for processor 12. The assembled code for the program components used to implement the method, discussed in more detail below, is stored in files which are stored on hard disk 18. Preferably, these files are read from hard disk 18 at system initialization and loaded into memory for the DOS operating system or Windows interface program. As known in the art, the memory space of the system is divided so the DOS operating system memory space is mutually exclusive of the memory space used by the Windows interface program. Accordingly, the method of the present invention preferably uses the DPMI to make active the memory in which the program components of the present invention are loaded regardless of whether DOS or Windows is executing. Preferably, the program components of the access control program of the present invention are terminate stay resident (TSR) programs in the Window 3.x environment and virtual device drivers (VxD) programs in a Windows 95 system.

At system power up, the processor begins system initialization by transferring control to a program which verifies the operational status of system memory and the basic input and output operations of the system. Such programs are well known and are generally called BIOS programs. Upon completion of the BIOS program, the system may execute BIOS extensions programs which verify certain expansion devices for the system or control may be transferred to a system initialization file on a user's diskette or hard drive. The system initialization file probably continues by verifying that the user bringing up the system is authorized for use of the system. If the user is authorized, installation of the programs necessary for the operating system and the user interface continues. Control is then transferred to the user interface so the user may begin to select programs for execution and use. If the user is not authorized for system use, the system initialization program denies the user access. After a predetermined number of attempts to gain access have failed, the program aborts system initialization.

Preferably, the resource control system and method of the present invention are implemented by an access control program which is installed on the PC once a user is given access to the system. The program is typically provided on a diskette which is placed in the disk drive of a PC system. The diskette is provided with an installation program which creates a directory for the access control program on the user's hard disk drive. The files containing the program components are then copied into this directory. Part of the installation procedure is to insert commands into a system initialization file, such as the AUTOEXEC.BAT file, before the command which activates an operating system or Windows interface program. These commands activate the program components of the access control program before the operating system or Windows interface program is activated at system initialization. After the access control program is installed, the program requests the user to register as the Primary User and to identify a password. This password is used to identify the Primary User at subsequent logins. After installation of the program and registration of the Primary User, only the Primary User may thereafter install software on the PC, upgrade the access control program or uninstall the access program.

Now the Primary User may use the access control program to add users, define the application programs accessible for each user, and restrict the directories, drives, communication ports and printer ports available for the users. Additionally, the Primary User may allow selected users to be able to exit the Windows interface program and operate within the DOS environment.

Figure 2:
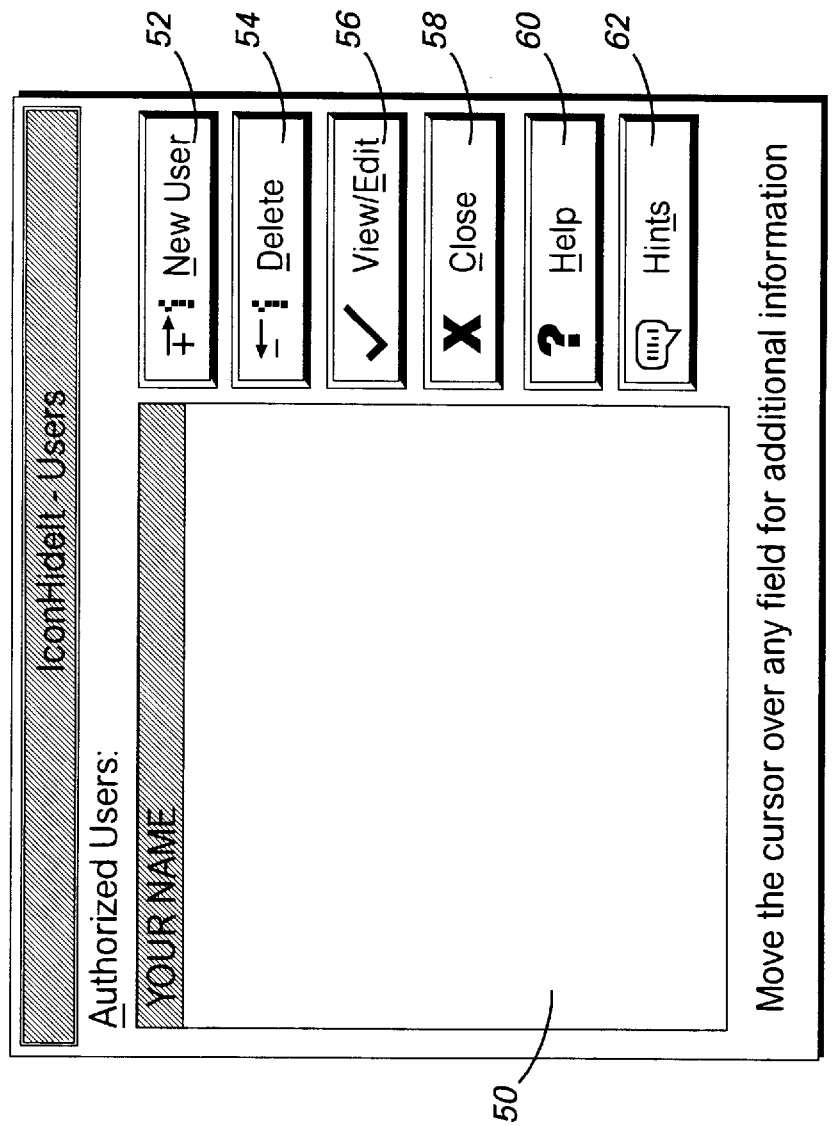
FIG. 2 is an illustration of an exemplary display of the manage user function.

To identify or add users to the PC, the Primary User selects the manage users program component. This program component causes a display of the Primary User's name and any other users currently on the system. An exemplary display is shown in FIG. 2. The Primary User may view a list of authorized users in window 50. To add a user, the primary user activates the new user function which causes the display of FIG. 3 to appear so the primary user can enter the user's name and resource parameters. The display of FIG. 2 also includes function buttons for deleting a user (54), viewing or editing a user's profile (56), and closing the manage user function (58). A help function (60) and hint function (62) are also provided to facilitate the primary user's use of the function. In response to the closing of the manage users function, the access control program generates a file of authorized user identifiers and, as each user supplies a password, the file is updated with each user's corresponding password. This file is used by the access control program to limit access to the system to authorized users only.

Figure 3:
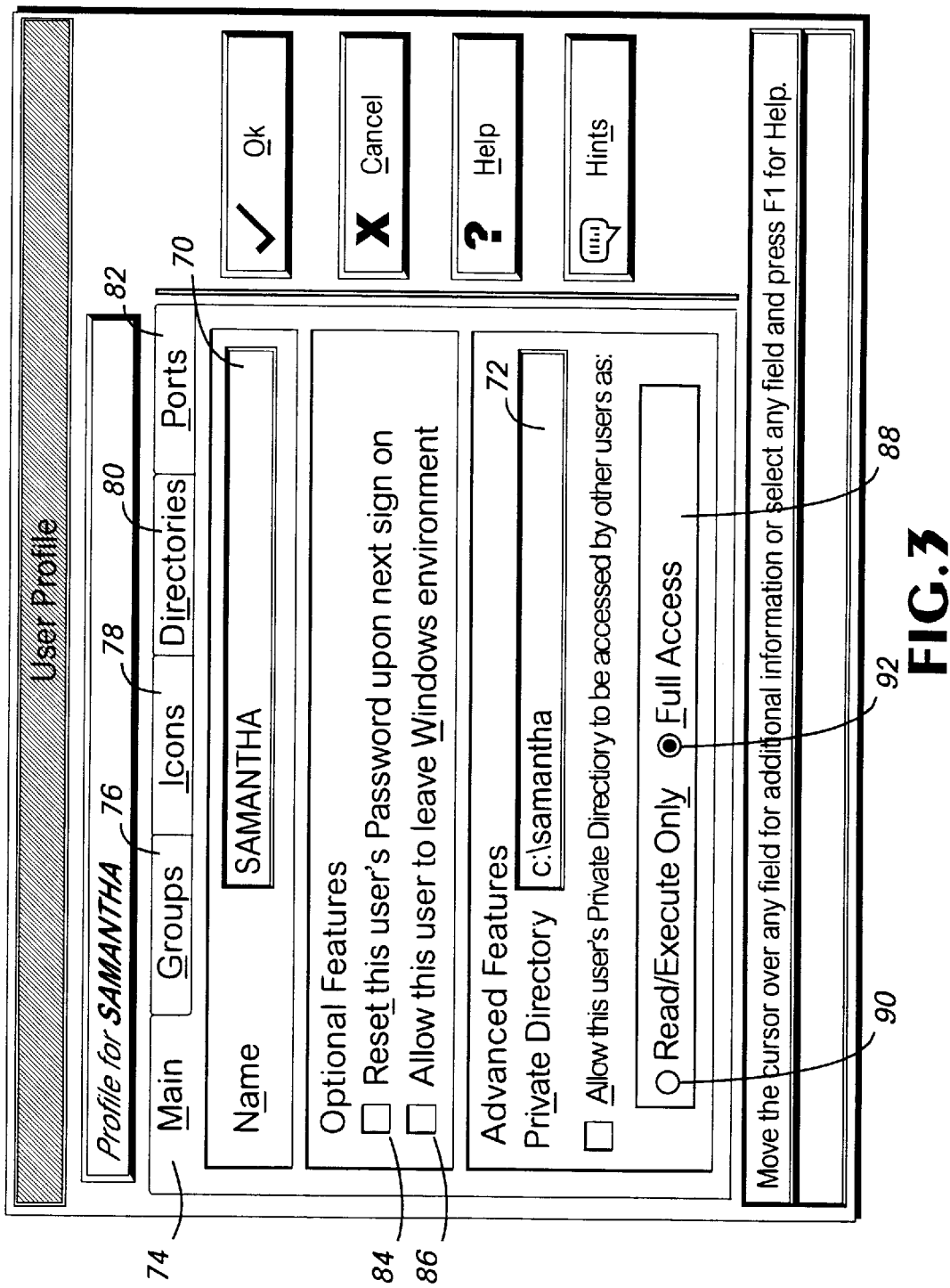
FIG. 3 is an illustration of an exemplary display of a user profile.

By activating the view/edit function, the Primary User may also then activate a folder corresponding to one of the previously authorized users. Preferably, the folder is opened by highlighting the user's identifier in window 50 and clicking the mouse cursor over the view/edit function. An exemplary folder for a user is shown in FIG. 3. As shown in FIG. 3, the folder includes a window for the user's name (70) and a private directory (window 72) for the user, if one has been identified by the Primary User. The folder preferably includes five tabs which identify the authorized resources for a user. These tabs include main (74), groups (76), icons (78), directories (80) and ports (82). The main tab is used to identify a directory where a user may keep files which are inaccessible to other users. If the Primary User enters a directory within the private directory window 72, the access control program creates the directory for the user. The Primary User may also indicate whether the user's password is to be reset (window 84), whether the user shares the private directory with another (window 88), and whether the user may leave the Window's environment to operate the DOS environment (window 86). A user must assign a password to his or her user name at the first sign-in following addition of the user's name to the user list otherwise the access control program does not give the user access to the PC system. If the user's directory is going to be shared with other users, the Primary User may specify whether the user's private directory may be only read by others (windows 90) or whether others may be able to read and modify the contents of files in the user's private directory (windows 92).

Figure 4:
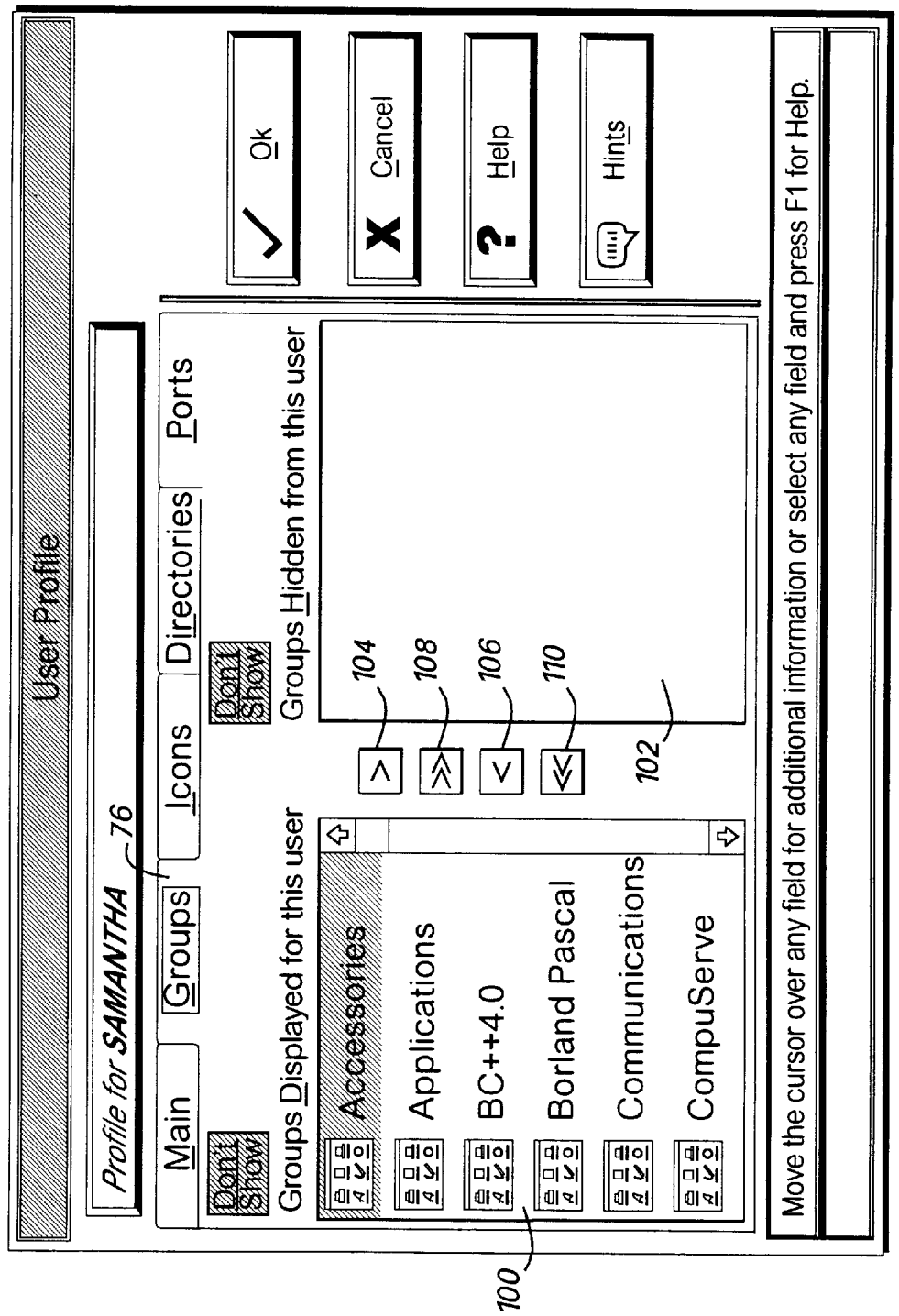
FIG. 4 is an illustration of an exemplary display of a program group access function.

Upon selecting the tab groups 76, the Primary User is presented with a display of application program groups. An exemplary display of application program groups is shown in FIG. 4. Any of the application groups shown in the left-hand window 100 entitled Groups Displayed for this user are available to that user. Conversely, program groups shown in the Groups Hidden from this user window 102 are not available to that user. To move a program from one category to the other, the user may use the mouse cursor to highlight a program group and then click on to the right pointing arrow 104 to transfer the selected program group to the Groups Hidden window 102 or the reverse may be achieved by selecting a program group and clicking on the left pointing arrow 106 to transfer the selected program group to the Groups Displayed window 100. The double arrow buttons 108 and 110 shown in the exemplary display are preferably used to transfer all of the application groups from one window to the other window. In response to defining the program groups to be displayed and hidden, the access control program generates a file identified by the user's identifier which identifies a list of program groups which are not displayed for user selection.

Figure 5:
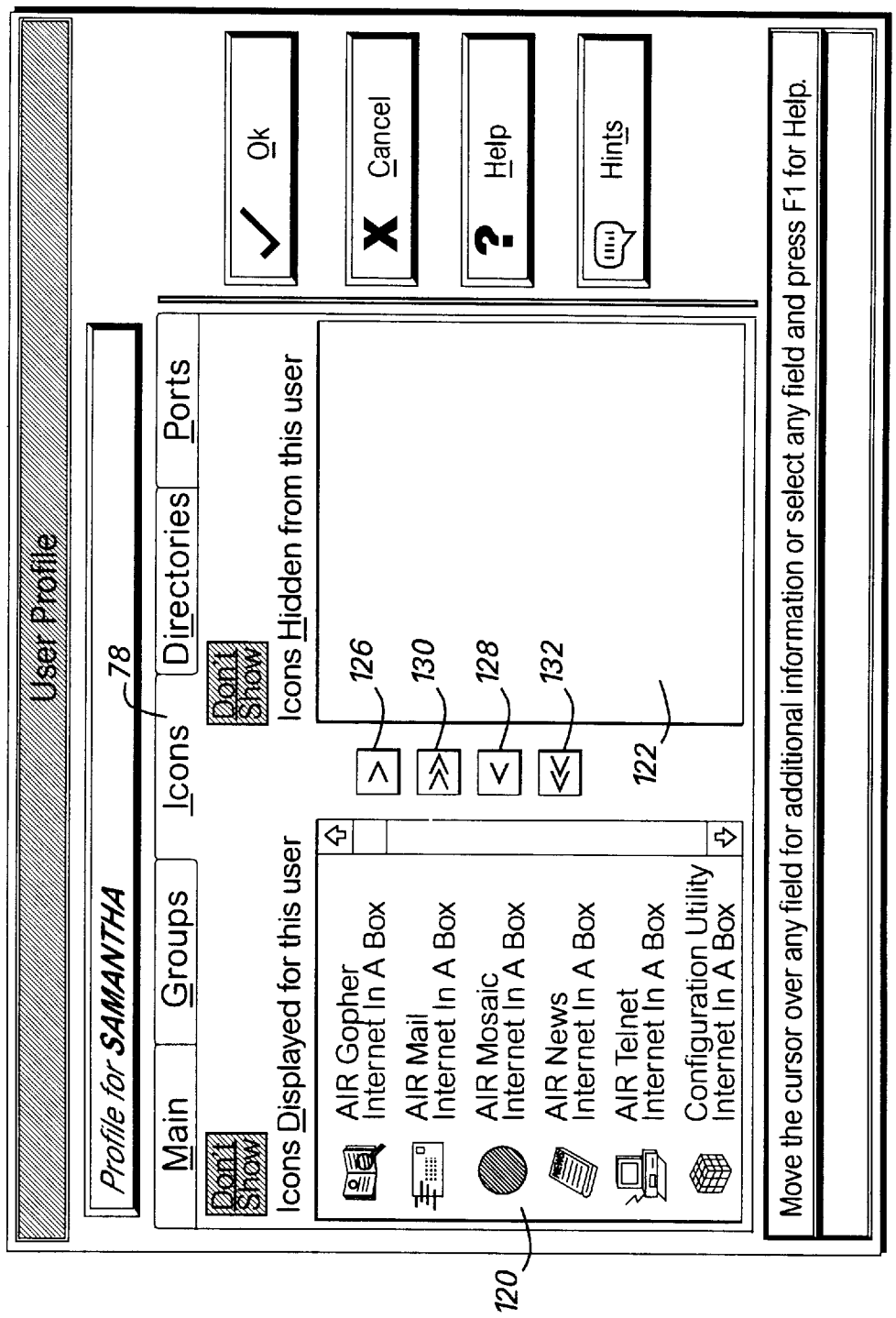
FIG. 5 is an illustration of an exemplary display of a program icon access function.

By activating the icons tab 78, the Primary User is presented with a display of the program icons for the previously selected program group. An exemplary display of program icons is shown in FIG. 5. Again, the Primary User may transfer programs from the Icons Displayed window 120 to the Icons Hidden window 122 or from the Icons Hidden window 122 to the Icons Displayed window 120 using arrow functions 126, 128, 130 and 132 in a manner similar to that discussed above with respect to FIG. 4. In response to defining the program icons to be displayed and hidden, the access control program generates a file identified by the user's identifier which identifies a list of program icons which are not displayed for user selection.

Figure 6:
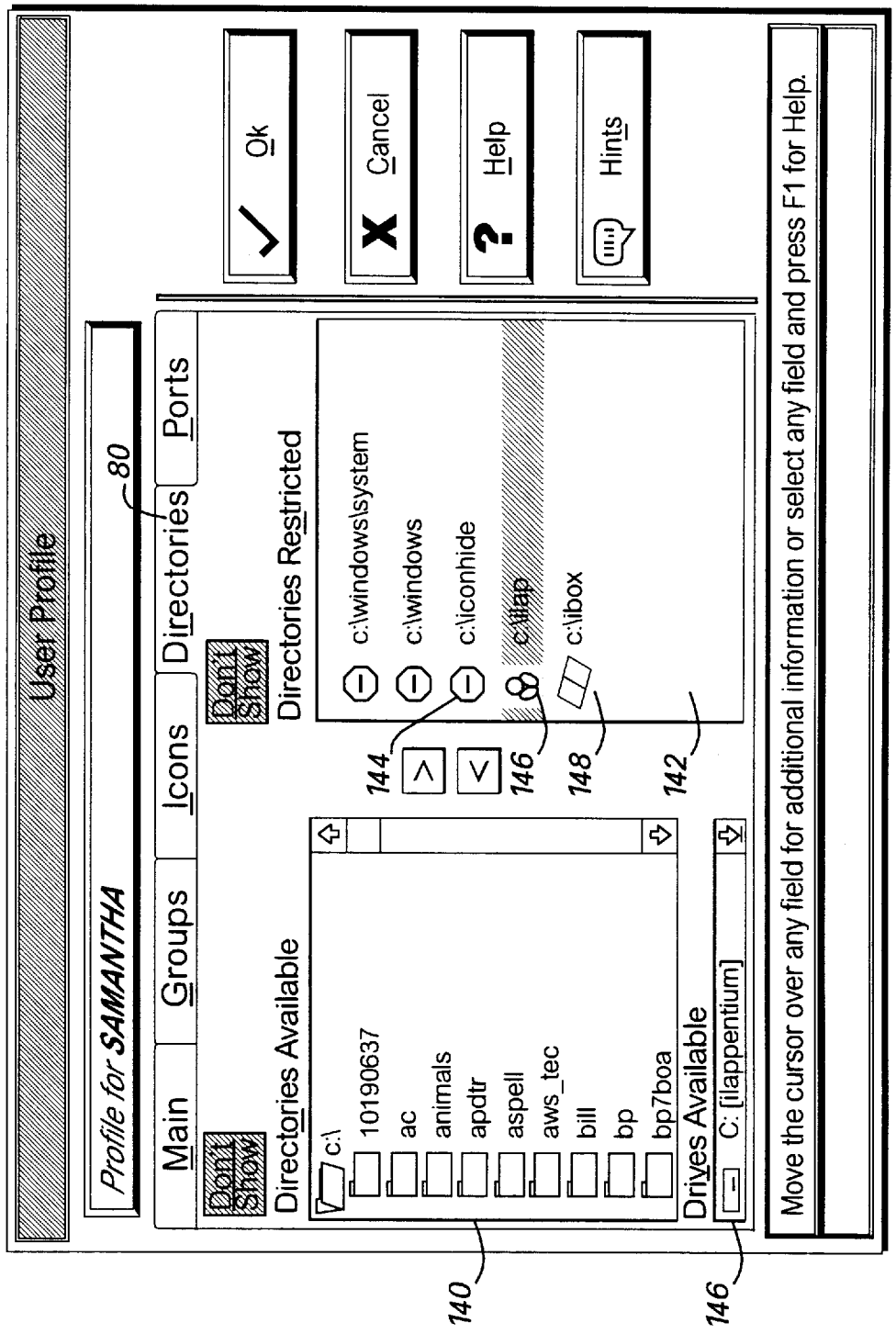
FIG. 6 is an illustration of an exemplary display of a directory access function.

By activating the directories tab 80, the directories on the system are displayed. The directories which may be accessed by a user and those which are not accessible by a user are shown in the display. An exemplary display for this program component is shown in FIG. 6. Again, directories and subdirectories may be transferred from the Directories Available window 140 to Directories Restricted window 142 by the method described above with respect to the group and icon windows. Certain directories in the Directories Restricted window 142 cannot be made available to a user. These directories are system directories for the operating system or Windows interface program and the access control program (which is identified in FIG. 6 as the C:\CONHIDE directory). Other directories may be made available to a user on a read only basis. While access to the other directories in the restricted list are completely restricted, the status of these directories may be changed by the Primary User. Preferably, a stop sign 144 is used to indicate the directories for which the restricted status cannot be changed, a lock symbol 146 is used to indicate restricted directories which cannot be accessed by a user, and an open book 148 which is used to identify the directories which are available to a user on a read only basis. Preferably, directory identifiers are limited to 255 characters to comport with the restrictions on directory path names imposed by the operating system or Windows interface program. To restrict a user's access to a drive, the drive is selected in the Drives Available window 146 and the root directory for the drive appears in the Directories Available window 140. The root directory may then be transferred to the Directories Restricted window 142 to make the drive unavailable for the user. In response to defining the directories which may be accessed by a user, the access control program generates a file identified by the user's identifier which identifies a list of directories to which the user is denied access or whose access is limited to read only.

Figure 7:
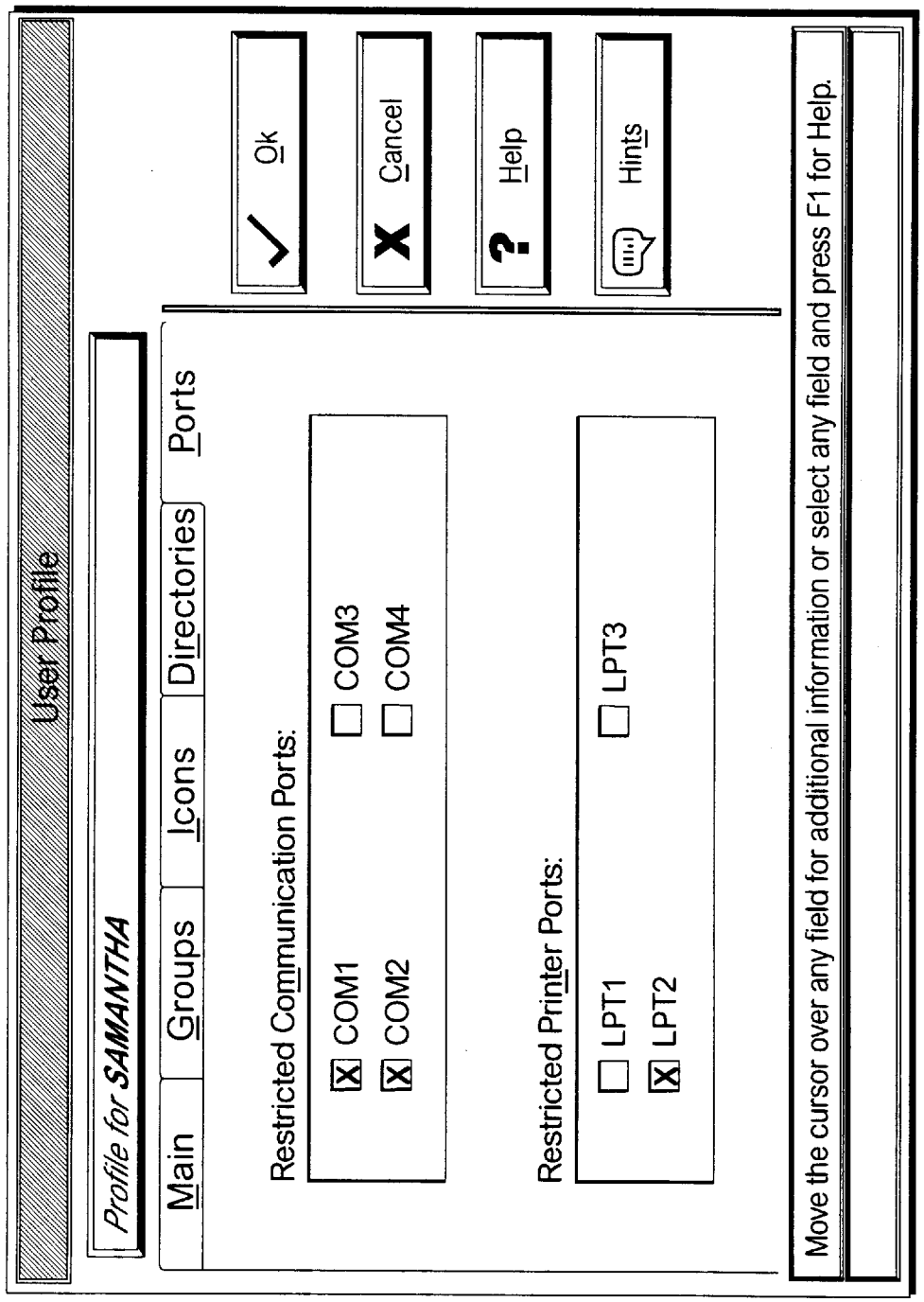
FIG. 7 is an illustration of an exemplary display of a port access function.

By activating the ports tab 82, the ports program component generates a list of the communication and printer ports available on the system. An exemplary display is shown in FIG. 7. Those communication and printer ports which have an "X" in the window next to a port identifier, such as COM1, indicate that those communication and printer ports have been restricted from use for that user. In response to the definition of these ports as being restricted or not, the access control program generates a file identified by the user's identifier of ports to which the user is denied access.

The restricted lists for the groups, programs, directories, and ports are placed in files which are associated with a user's identifier. These files are then used by the access control program to modify system files when a user signs on the system. Specifically, after system initialization has been performed by the BIOS, control is transferred to the access control program. This program prompts the user for a user name and corresponding password. If the password and user name are verified, the files containing the lists of restricted groups, programs, directories, and ports are read by the access control program. The access control program uses the group and program lists to delete references to those files from the system files. In the Windows 3.x environment this is done by passing the lists to the dynamic data exchange (DDE) which causes the program manager to delete the specified resources from the Group and INI files. Thereafter, the only group folders and program icons which are displayed are those which were not deleted at user sign on. The access control program also monitors calls to the DDE and program manager to prevent the restoration of deleted resources to the system files by a user. The directory and port lists are used to generate tables for the program components of the access control program which control the I/O routines that interface with the drives and ports of the PC system.

These tables are maintained in memory with the program components and remain active regardless of whether the operating system or Windows interface program is executing since the DPMI is used to make the memory in which the program components are located accessible. When the program components trap a request for a directory or port, the I/O routine of the program component verifies that the requested directory or port is authorized for the user currently on the system.

In the Windows 95 environment, the access control program modifies the registry file since this file is used to define the computer resources which a user can access and which the Windows 95 program accesses to generate displays of program icons and program groups. Because Windows 95 performs its own user login procedure, the transfer from the login procedure to the access program is done differently. The login procedure in Windows 95 assigns the user a default user registry file if the user cannot enter a password that corresponds with a user's identifier or if the user aborts the login procedure. To prevent this default user from gaining control of the system, the access control program modifies the default user profile in the registry file so the default user is not authorized to use any system resources. If the user enters a corresponding password, however, the files identified by the user's identifier are used to define the resources in the registry file. Since Windows 95 uses this file to display program icons and program groups, the system only displays the ones which the Primary User identified for the user through the access control program. The access control program may use an application program interface (API) to modify the registry system file in accordance with the restricted list files generated by the access control program.

The access control program may also include a function for limiting a user's access to a computer resource to a particular time period. This time restriction may be defined for a program group, program, directory, or port. The access time is stored in the corresponding file for the resource and is accessed by a program component at user login. If any resource has a corresponding access time, the program component retrieves the system time maintained by the system time function and compares system time to the access time to determine whether the resource should be displayed as being available for the user. In this way, the Primary User may deny access to a games program group, for example, during afternoon hours when the user should be using the PC to do his or her homework.

Preferably, the access control program is implemented by three program components. One program component is loaded resident in memory to, preferably, allocate memory space for a user and monitor memory access. This program allocates memory for a user and verifies that the attempted memory access is for a memory location in a memory space authorized for the user. The second program component loaded into memory preferably monitors operating system and/or Windows calls to verify whether the requested resource is authorized for access by the user. The third program component preferably monitors BIOS calls to verify whether the requested resource is authorized for access at system startup. This program is used to detect boot programs which a user may try to use to gain control of the system at initialization. Although these functions may be performed by a single program component, three program components are preferably used. Whenever one of the program components is activated for a verification function, it communicates with the other two program components to verify they are still loaded and are operational. Thus, if a user is able to find and modify one program component to access unauthorized resources, the other two program components detect the change. In response to a detected change, the program component resets the system so that all three program components are reloaded from the hard disk to memory to overwrite the changed program component. The TSR programs preferably used in the Windows 3.x components environment are loaded into system memory at system initialization. The VxD programs used in a Windows 95 system may be dynamically loaded anywhere in memory.

When the user logs off, the system maintains the same tables and system files until another user tries to log on. If the user is verified, the file containing all of the system resources is retrieved from the hidden location on the hard drive. This file is used to restore the system files of the system. The restricted lists for the user are then retrieved and these lists are used to delete group and programs from the system files and to initialize the tables in the same manner previously discussed. Alternatively, a user may log off and power off the system, in which case, the system simply reboots upon the application of power by the next user.

The access control program also includes a program component for preventing a boot program on the diskette drive from controlling the PC. The executable code for this component is stored in a file on the PC hard disk. When the Primary User installs this feature, the access control program modifies and moves the master boot record (MBR) and partition table on the hard disk. It then modifies the boot record so this component operates following the termination of BIOS operation at system power up.

Figure 8A:
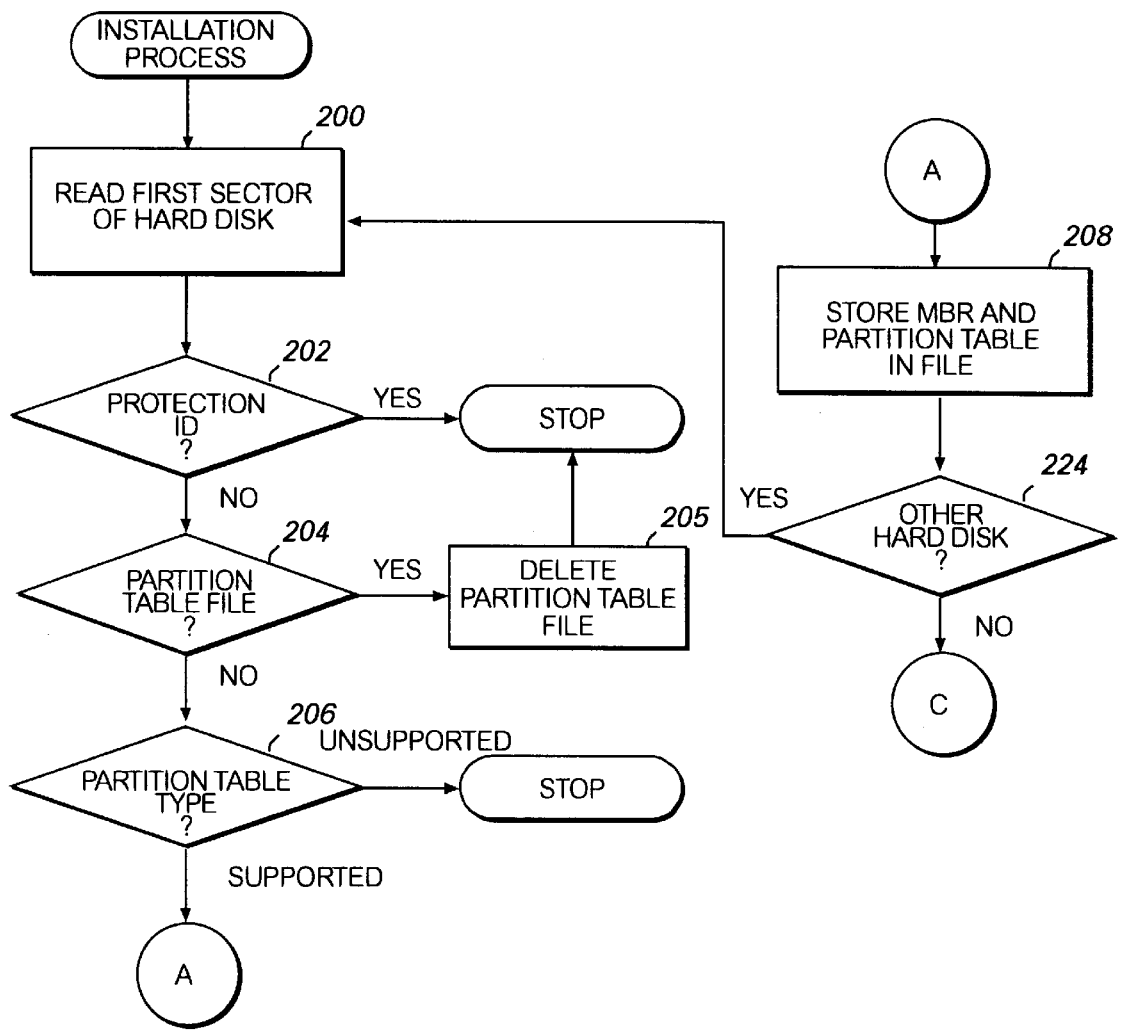
FIG. 8A and 8B are flow charts of the process to install a hard disk protection program which operates in accordance with the principles of the present invention to reduce the likelihood that a boot program stored on media in a diskette drive can be used to initialize the system of FIG. 1.
Figure 8B:
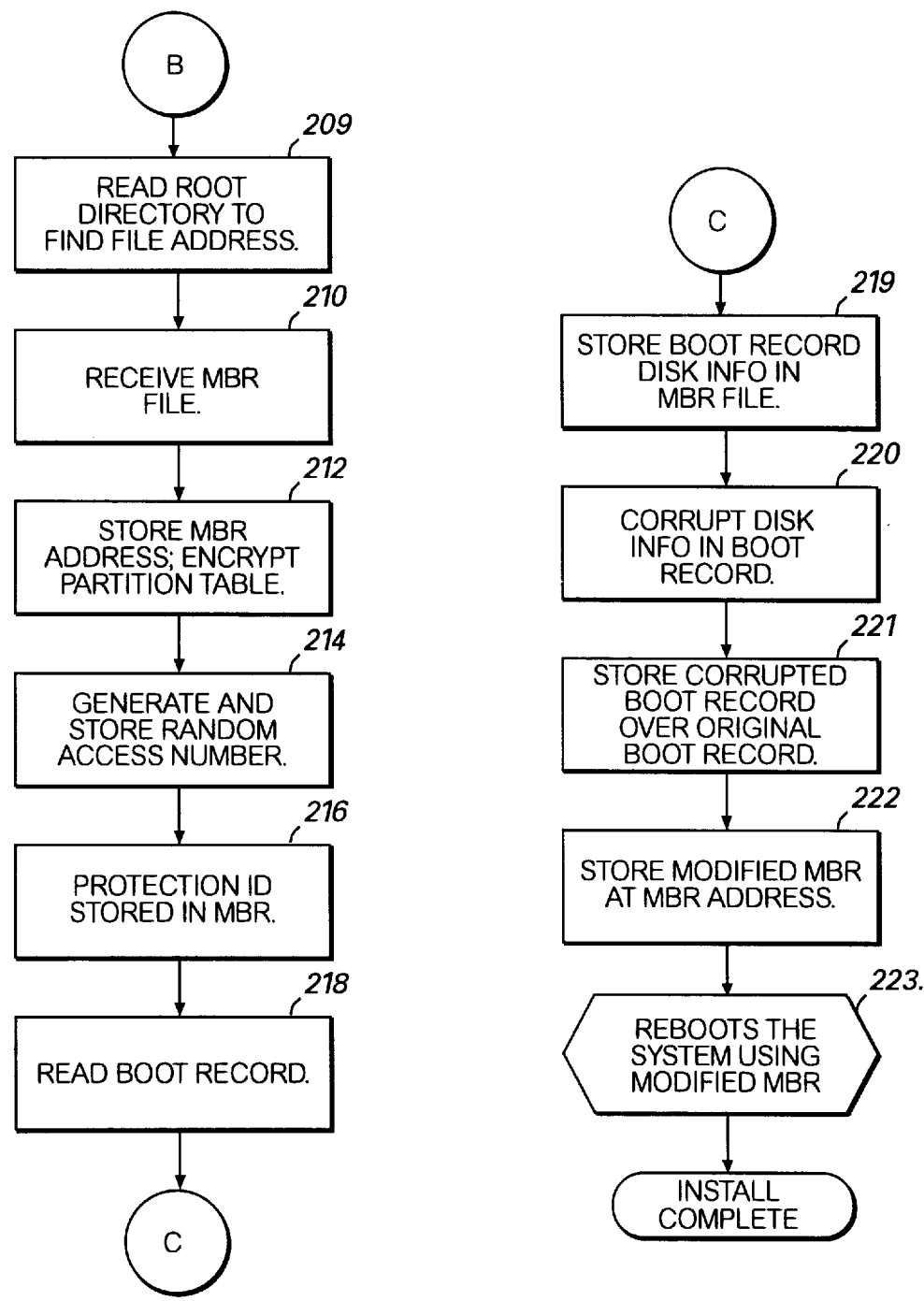

The installation process for this program component is shown in FIG. 8. That method begins by reading the first sector of the hard disk (Block 200) to determine whether this program component has been previously installed (Block 202). Preferably, this is done by determining whether a particular byte or group of bytes within the first sector has a predetermined value. If the component has been installed previously, the installation stops. Otherwise, the installation program verifies whether the file in which the program stores a copy of the partition table already exists (Block 204). If it does, then the installation program deletes it (Block 205) and stops. This is done to permit the hard drive protection program to be installed, if the user wants to add it. Otherwise, the hard disk remains unprotected.

If the program determines that the hard disk protection program has not been previously installed or that any vestige of the program remain, it examines the partition table stored on the hard disk (Block 206) to determine whether the system operating the disk is compatible with the protection program. For example, DOS and Windows partition a hard disk into four partitions while other operating systems partition the disk differently. If the operating system is not supported then the installation terminates. Otherwise, the program copies the MBR and partition table to a file (Block 208). This process is repeated for any other hard disks for which the user desires to install the protection (Block 224).

Installation continues by searching the root directory of the hard disk to locate the cylinder/track/sector address of the file in which the MBR and partition table are stored (Block 209). The file containing the MBR program is then retrieved (Block 210). The address of the original MBR on the disk is stored for future reference and the original partition table on the disk is encrypted and rewritten to the disk (Block 212). Using a random number generator, an access number is generated and stored in the MBR program (Block 214). This is done to identify whether a user attempting to remove the hard disk protection program is authorized to do so. The protection program identifier is written into the MBR program (Block 216). The boot record is then read from the hard disk (Block 218) and the hard disk information, such as disk size, sector size, etc., is retrieved from the boot record and stored in the MBR program (Block 219). The hard disk drive information in the boot record is corrupted (Block 220) and the boot record rewritten to the hard disk (Block 221). The MBR program is then written to the address of the original MBR (Block 222) and the system is re-initialized with the new MBR to install the hard disk protection program (Block 223).

Figure 9:
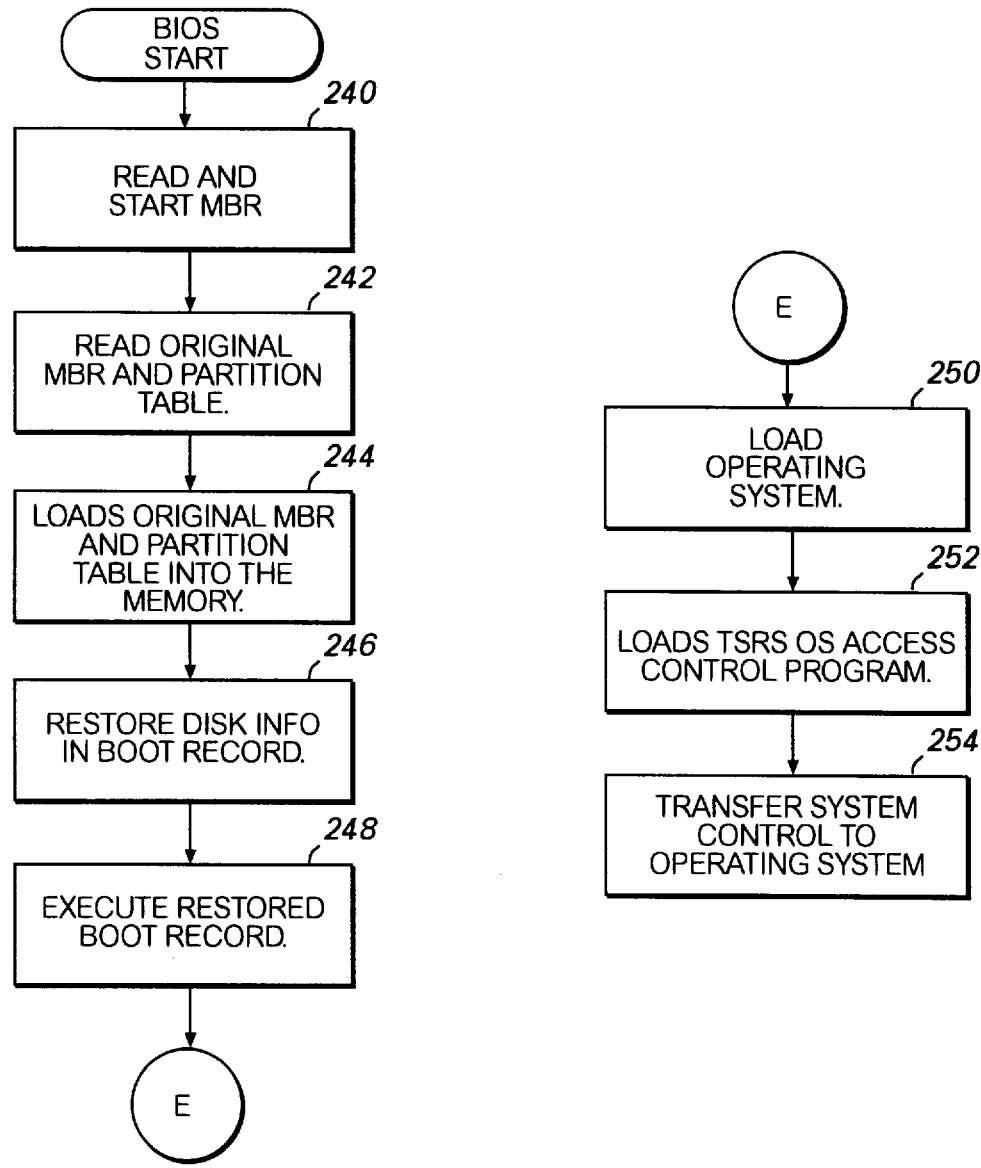
FIG. 9 is a flow chart of how the hard disk protection program controls system initialization and transfers control to the access control program.

The boot process performed in response to system start up under control of the modified MBR program is shown in FIG. 9. After BIOS has completed its initialization with a normal termination, the BIOS reads the MBR program (Block 240) and begins its execution. The modified MBR program reads the original MBR and partition table from the hard disk (Block 242) and loads them into memory (Block 244). The hard disk information in the modified MBR program is then written into the boot record (Block 246) and the boot record is stored in memory and executed (Block 248). The operating system is loaded (Block 250) and the system initialization batch file (AUTOEXEC.BAT in DOS computers) is executed (Block 252). The execution of this file loads the program components for the access control program into memory. System control is then transferred to the operating system (Block 254). Thereafter, interrupts to access the hard disk are intercepted by one of the program components which use the modified MBR program and restored partition table and boot record to control access to the hard disk.

After the hard disk protection program and access control program have been installed, the program and the access control program control access to the operating system and computer resources of the system. Upon system initialization, the BIOS executes and, at its termination, activates the hard disk protection program, if installed. This program controls access to system resources during the remainder of system initialization and loads the operating system and program components for the access control program. Control is transferred to the operating system and the program components of the access control program limit user access to the resources identified in restricted lists as set forth above. If a user attempts to boot the system with a boot program stored on media or a diskette drive, the boot program tries to use the hard disk interrupt to look at the master boot record. In this case, the program is unable to gain sufficient information to search the hard disk and load the operating system. If the hard disk protection program is not installed, system initialization continues with the loading of the operating system and the program components of the access control program, however, the protection provided by the hard disk protection program is not available. Control is then transferred to the operating system. Thereafter, the access control program intercepts interrupt service calls and verifies whether the user is authorized to access the requested resource.

While the present invention has been illustrated by a description of preferred and alternative embodiments and processes, and while the preferred and alternative embodiments and processes have been described in considerable detail, it is not the intention of the applicant to restrict or in any way limit the scope of the appended claims to such detail. For example, a file identified by a user identifier may be generated which contains those resources for which a user is authorized to use. This list of resources may be used to delete any reference to resources in a system file not contained in the file. Such additional advantages and modifications will readily appear to those skilled in the art.

What is claimed is:

1. A method for limiting a user's access to computer resources of a computer system, comprising:

relocating an original master boot record and an original partition table from a first location to a second location on a hard disk;

providing a corrupted master boot record and a corrupted partition table at said first location so that a program using the corrupted master boot record and said corrupted partition table is unable to initialize said system; and using, via a security protection program, at system initialization said corrupted master boot record and locating via the security protection program, said original master boot record and said original partition table at said second location to initialize said computer system.

2. The method of claim 1 further comprising the step of:

controlling computer initialization using said relocated master boot record and said relocated partition table; and installing a program component for controlling access to computer resources in a memory of said system prior to allowing a user to access said computer.

3. The method of claim 1 further comprising the step of:

deleting hard disk information from a boot record; and storing said hard disk information in said corrupted master boot record so that said hard disk information may be restored in said boot record prior to activating said boot record.

4. The method of claim 1 wherein said second memory location is determining from the steps of:

copying the original master boot record to a file during set-up of the security protection program;

searching the root directory of the hard disk to locate a cylinder/track/sector address of the file containing the original master boot record; and storing the address of the original master boot record for reference by said corrupted master boot record.

5. A software-implemented system for controlling access to a hard disk during a computer system initialization comprising:

a modified master boot record written to a memory location on a hard disk corresponding to location for an original master boot record;

a corrupted partition table written to a memory location on said hard disk corresponding to a location for an original partition table;

an original partition table stored to a location on said hard disk different from said corrupted partition table; and a corrupted boot record written to a memory location on said hard disk corresponding to a location for an original boot record whereby said modified master boot record accesses previously stored information during system initialization to restore said boot record for system initialization.

6. The system of claim 5 wherein said modified master boot record loads a program component for controlling user access to computer resources before a user is provided access to a computer.

7. The system of claim 5 said modified master boot record including:

a protection program identifier so that installation of said modified master boot record may be verified.

8. The system of claim 5 wherein said corrupted partition table is encrypted.

9. The system of claim 5 wherein said stored disk information is removed from said original boot record.

10. A computer implemented method that prevents unauthorized access to a computer system, comprising the steps of:

moving an original master boot record from its original location to a non-standard location in memory;

creating a modified master boot record by storing a modified partition table in the modified master boot record that has different specifications than the original master boot record, said modified partition table containing specifications that prevents an operating system from booting from a diskette, thereby preventing access to computer system resources;

storing the modified master boot record at the location corresponding to the original location of the original master boot record; and using said modified master boot record to control access to computer system resources.

11. The method of claim 10 wherein said non-standard memory location is an arbitrary memory location determined by a security protection program.

12. The method of claim 11 wherein said arbitrary location is determining from the steps of:

copying the original master boot record to a file during set-up of the security protection program;

searching the root directory of a hard disk to locate a cylinder/track/sector address of the file containing the original master boot record; and storing the address of the original master boot record for reference by said modified master boot record.

13. A computer implemented method that protects a computer system from unauthorized access, comprising the steps of:

accessing a boot record of a hard disk;

changing the boot record data in a manner that prevents an unauthorized user from accessing the hard disk; and storing information that enables the original boot record data to be restored by an access protection program.

14. The method of claim 13 comprising the steps of:

removing disk information from the boot record of the hard disk; and storing information removed from said boot record in a manner that enables the original boot record data to be restored by the access protection program.

15. The method of claim 14 further comprising the steps of:

moving a master boot record to a non-standard memory location different than the original location for the master boot record;

creating a modified master boot record which is stored at the original location of the master boot record; and storing information in the modified master boot record that enables the boot record to be restored by a security protection program.

16. The method of claim 15 wherein said non-standard memory location is an arbitrary memory location determined by the security protection program.

17. The method of claim 16 wherein said arbitrary location is determined from the steps of:

copying the master boot record to a file during set-up of the security protection program;

searching the root directory of the hard disk to locate a cylinder/track/sector address of the file containing the master boot record; and storing the address of the original master boot record for reference by said modified master boot record.

18. The method of claim 17 further comprising the step of corrupting a partition table in a manner that prevents the computer system from booting.

* * * * *